(12) United States Patent
Mizuma

(10) Patent No.: US 12,405,462 B2
(45) Date of Patent: Sep. 2, 2025

(54) OPTICAL SYSTEM AND IMAGE PICKUP APPARATUS

(71) Applicant: CANON KABUSHIKI KAISHA, Tokyo (JP)

(72) Inventor: Akira Mizuma, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 366 days.

(21) Appl. No.: 18/305,433

(22) Filed: Apr. 24, 2023

(65) Prior Publication Data

US 2023/0350195 A1     Nov. 2, 2023

(30) Foreign Application Priority Data

Apr. 27, 2022   (JP) .................................. 2022-073886

(51) Int. Cl.
    *G02B 27/00*     (2006.01)
    *G02B 15/15*     (2006.01)

(52) U.S. Cl.
    CPC ......... *G02B 27/0062* (2013.01); *G02B 15/15* (2013.01)

(58) Field of Classification Search
    CPC .................................................. G02B 27/0062
    See application file for complete search history.

(56) References Cited

U.S. PATENT DOCUMENTS

| | | | | |
|---|---|---|---|---|
| 7,715,121 | B2 * | 5/2010 | Sugita | .................... G02B 13/04 359/784 |
| 11,640,048 | B2 | 5/2023 | Mori | |
| 2022/0214530 | A1 | 7/2022 | Nakahara | |

FOREIGN PATENT DOCUMENTS

| | | |
|---|---|---|
| JP | 2019-109539 A | 7/2019 |
| JP | 2019-144477 A | 8/2019 |

\* cited by examiner

*Primary Examiner* — Joseph P Martinez
(74) *Attorney, Agent, or Firm* — Carter, DeLuca & Farrell LLP

(57) ABSTRACT

An optical system includes an optical element having negative refractive power and disposed on at least one of an object side and an image side of an intersection of an optical axis and a pupil paraxial ray. The optical element is made of a glass material and satisfies a predetermined condition.

12 Claims, 5 Drawing Sheets

OPTICAL SYSTEM AND IMAGE PICKUP APPARATUS

BACKGROUND

Technical Field

One of the aspects of the disclosure relates to an optical system and an image pickup apparatus.

Description of Related Art

Some image pickup apparatuses having an image sensor have recently used a Gaussian-type optical system as an imaging optical system having a large aperture diameter. The Gaussian-type optical systems are known to produce large longitudinal chromatic aberration. Japanese Patent Laid-Open Nos. (JPs) 2019-144477 and 2019-109539 disclose the use of an optical material having large dispersion and exhibiting anomalous partial dispersion in order to correct chromatic aberration over a wide wavelength range.

As disclosed in JPs 2019-144477 and 2019-109539, in a case where a glass having a low refractive index and low dispersion such as fluorite is used to change chromatic aberration by a predetermined amount or more, the refractive power of the lens surface is to significantly change. Therefore, in a case where the chromatic aberration is sufficiently corrected, the Petzval sum becomes excessively positively large and it becomes difficult to correct the curvature of field. The configurations disclosed in JPs 2019-144477 and 2019-109539 can correct chromatic aberration using a negative lens made of a material with a high refractive index and high dispersion, but have difficulty in correcting secondary spectra of longitudinal and lateral chromatic aberrations. Therefore, it is difficult to realize an optical system in which various aberrations such as longitudinal chromatic aberration, lateral chromatic aberration, spherical aberration, and curvature of field are satisfactorily corrected.

SUMMARY

One of the aspects of the present disclosure provides an optical system in which various aberrations are satisfactorily corrected.

An optical system according to one aspect of the disclosure includes an optical element having negative refractive power and disposed on at least one of an object side and an image side of an intersection of an optical axis and a pupil paraxial ray. The optical element is made of a glass material. The following inequalities are satisfied:

$$1.70 < Nd < 1.85$$

$$28.0 < vd < 39.0$$

$$-0.0100 < \theta gF - (0.64168 - 0.00162 \times vd) < -0.0040.$$

where Nd is a refractive index of the optical element for d-line, vd is an Abbe number of the optical element based on the d-line, and θgF is anomalous partial dispersion of the optical element for g-line and F-line. An image pickup apparatus having the above optical system also constitutes another aspect of the disclosure.

Further features of the disclosure will become apparent from the following description of embodiments with reference to the attached drawings.

DESCRIPTION OF THE EMBODIMENTS

Figure 1:
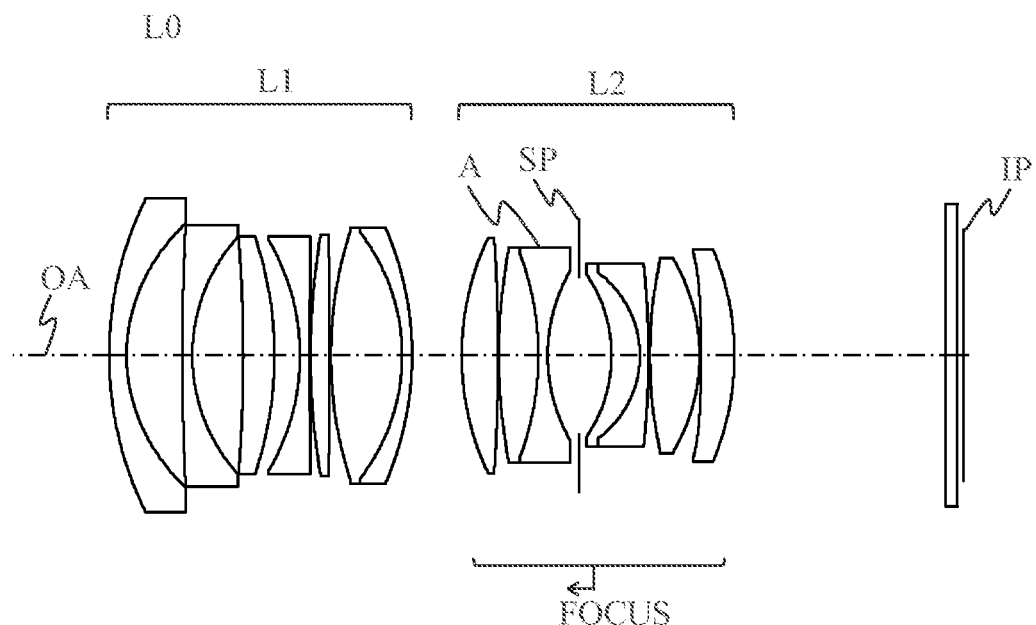
FIG. 1 is a sectional view of an optical system according to Example 1.
Figure 2:
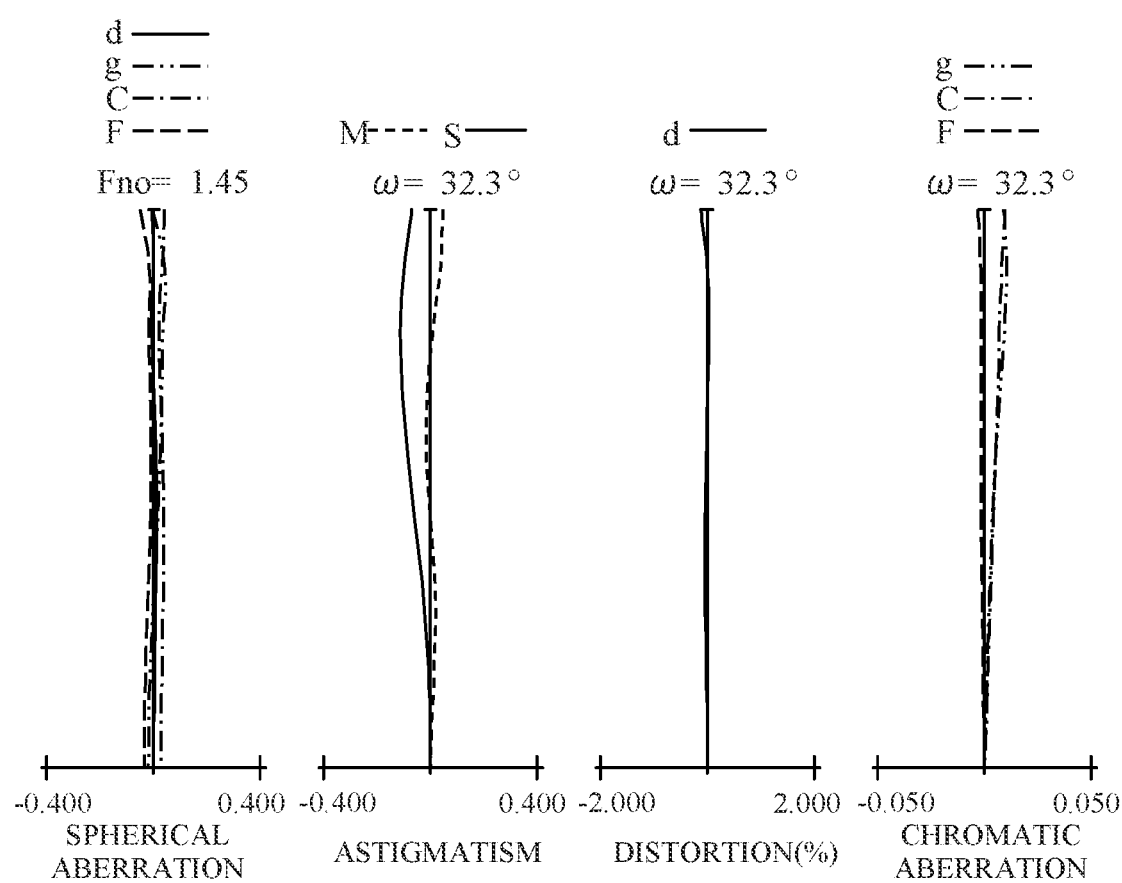
FIG. 2 is an aberration diagram of the optical system according to Example 1.
Figure 3:
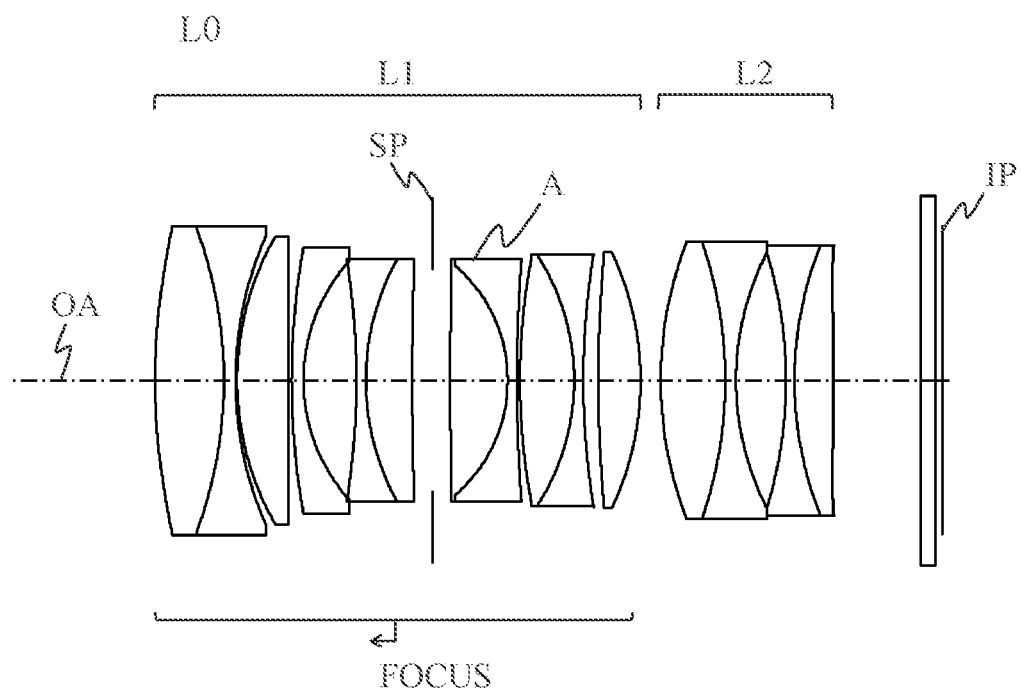
FIG. 3 is a sectional view of an optical system according to Example 2.
Figure 4:
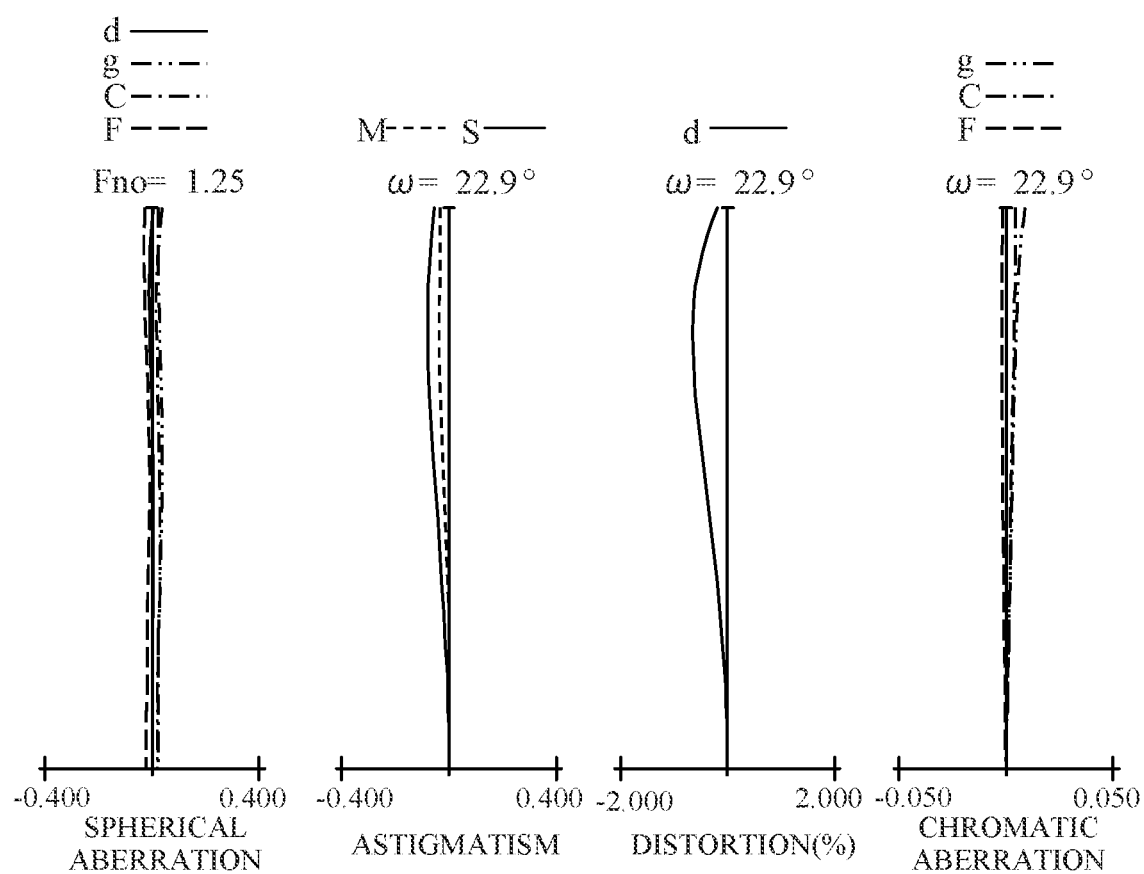
FIG. 4 is an aberration diagram of the optical system according to Example 2.
Figure 5:
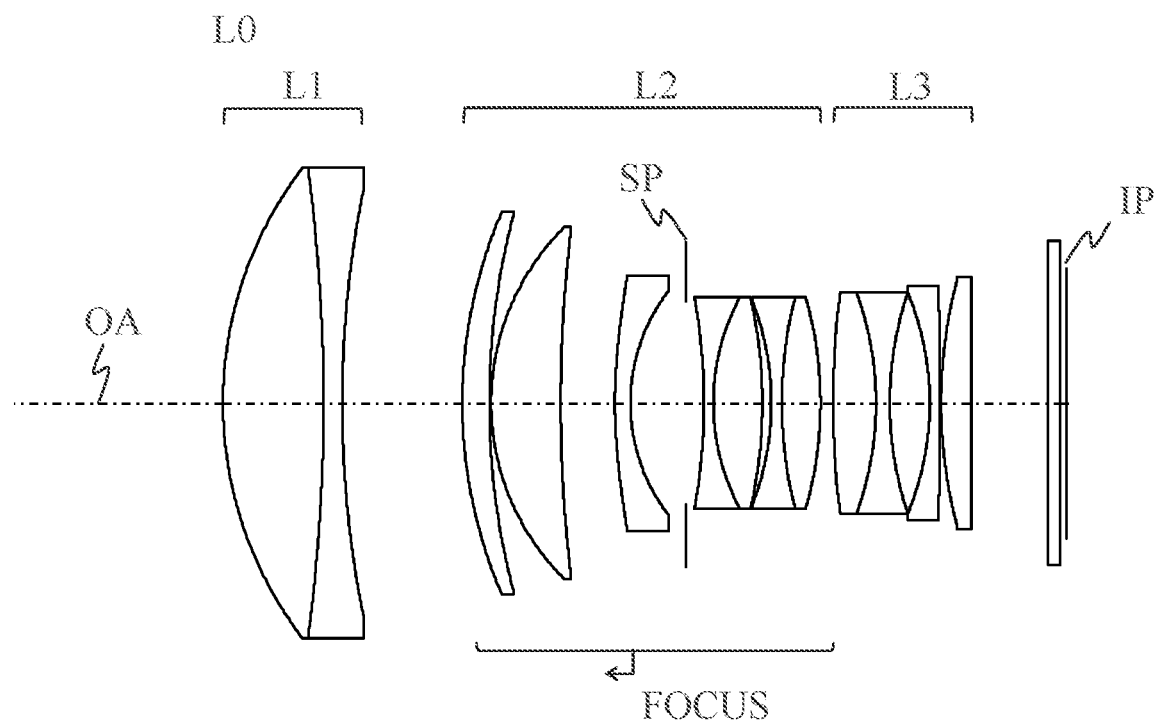
FIG. 5 is a sectional view of an optical system according to Example 3.
Figure 6:
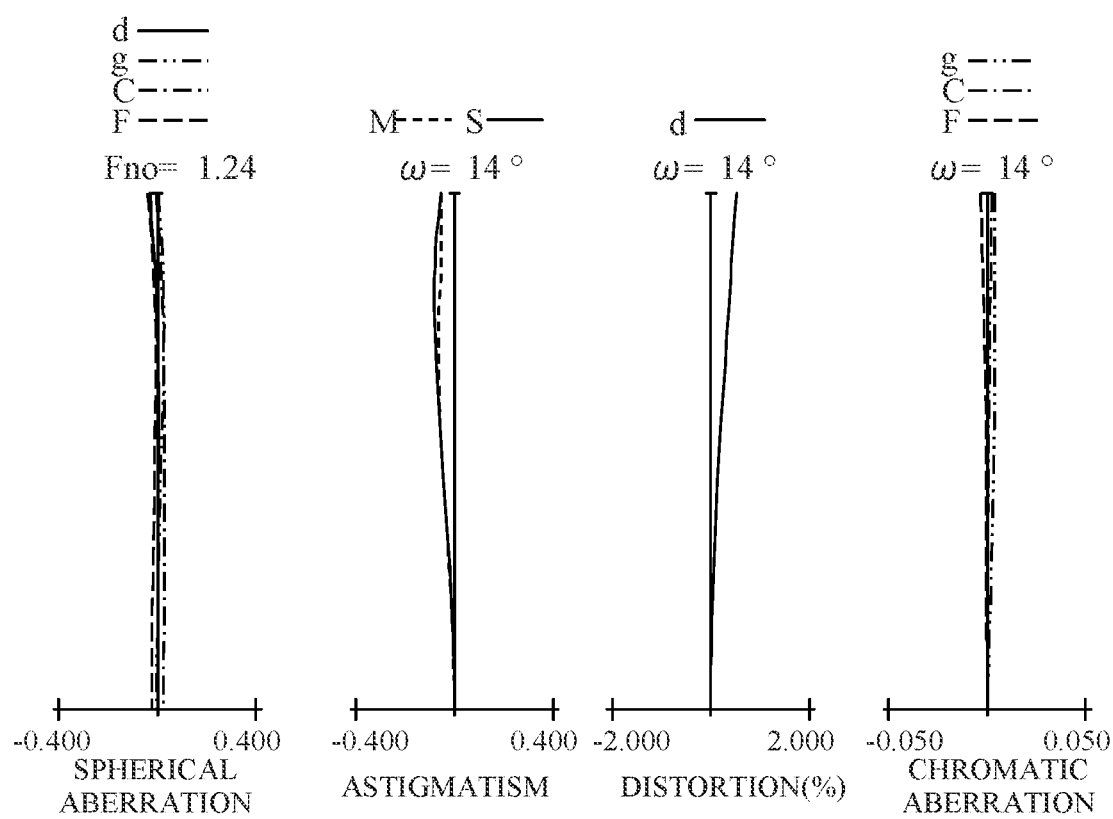
FIG. 6 is an aberration diagram of the optical system according to Example 3.
Figure 7:
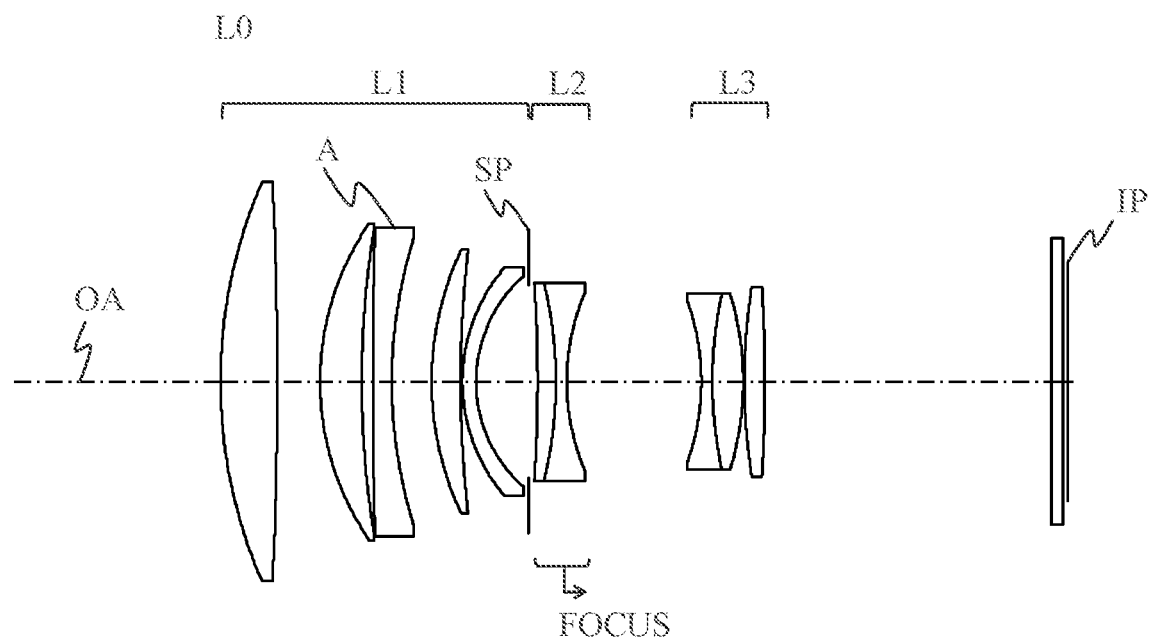
FIG. 7 is a sectional view of an optical system according to Example 4.
Figure 8:
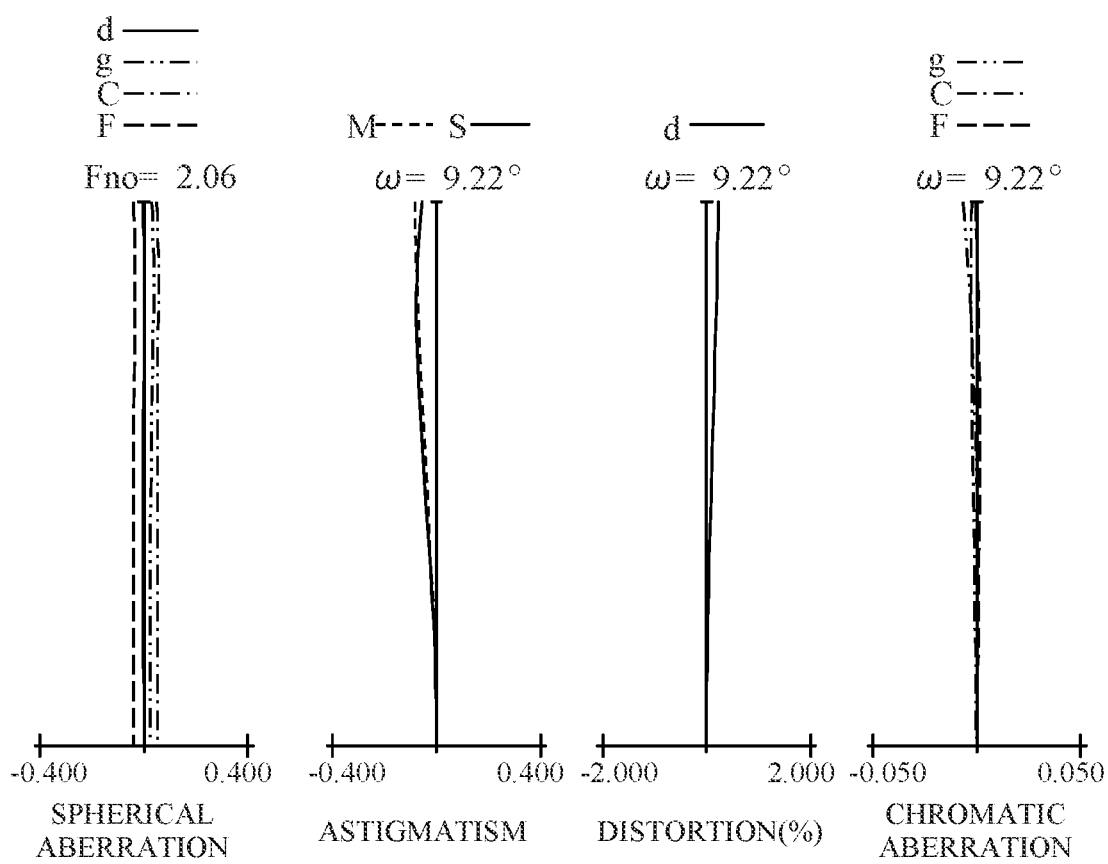
FIG. 8 is an aberration diagram of the optical system according to Example 4.

Referring now to the accompanying drawings, a detailed description will be given according to Examples according to the disclosure.

FIGS. 1, 3, 5, and 7 are sectional views of optical systems L0 according to Examples 1 to 4, respectively, in an in-focus state (on an object) at infinity. Each of the optical system L0 according to Examples 1 to 4 is a fixed focal length lens. The optical system L0 according to each example is applicable to an image pickup apparatus such as a digital video camera, a digital still camera, a broadcasting camera, a film-based camera, or a surveillance camera. Each example is not limited to a fixed focal length lens, and is applicable to a zoom lens.

In each sectional view, a left side is an object side (enlargement side), and a right side is an image side (reduction side). SP represents an aperture stop (diaphragm). IP represents an image plane, and in a case where the optical system L0 according to each example is used as an imaging optical system for a digital video camera or a digital still camera, an imaging plane of an image sensor (photoelectric conversion) such as a CCD sensor or a CMOS sensor is disposed on the image plane IP. On the other hand, in a case where the optical system L0 according to each example is used as an imaging optical system for a film-based camera, a photosensitive plane of the film (film plane) is disposed on the image plane IP. A lens unit (first lens unit L1 or second lens unit L2) labeled with "focus" in each sectional view is a (focus) lens unit configured to move during focusing. An arrow labeled with "focus" represents a moving direction of the (focus) lens unit during focusing from infinity to a close (or short distance) end.

FIGS. 2, 4, 6, and 8 are longitudinal aberration diagrams of the optical systems L0 according to Examples 1 to 4 in the in-focus state at infinity, respectively. In the spherical aberration diagrams, FNo denotes an F-number. The spherical aberration diagrams illustrate spherical aberration amounts for the d-line (wavelength 587.56 nm), g-line (wavelength 435.835 nm), C-line (656.27 nm), and F-line (486.13 nm). In the astigmatism diagrams, S represents an astigmatism amount on a sagittal image plane, and M represents an astigmatism amount on a meridional image plane. The distortion diagrams illustrate a distortion amount for the d-line. The chromatic aberration diagrams illustrate chromatic aberration amounts for the g-line, C-line, and F-line. ω denotes a half angle of view (°).

A description will now be given of the characteristic configuration and conditions of the optical system L0 according to each example. The optical system L0 according to each example includes an optical element A made of a glass material on at least one of the enlargement side and the reduction side of a point P, where an optical axis OA and a pupil paraxial ray intersect. The optical element A has at least one negative refractive power and satisfies inequalities (1) to (3), which will be described below.

Figure 10:
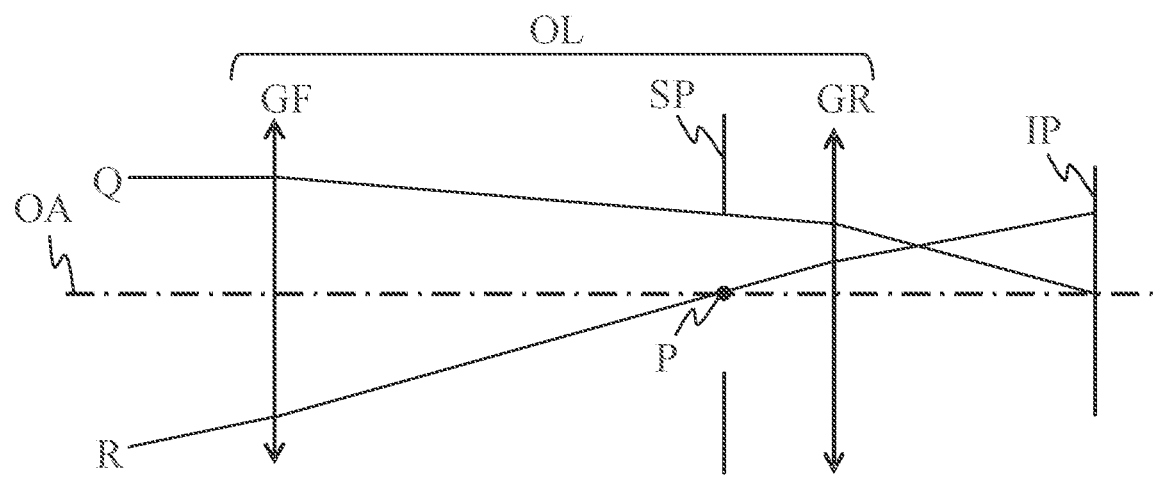
FIG. 10 explains a paraxial on-axis ray and a pupil paraxial ray.

Referring now to FIG. 10, a description will be given of a paraxial on-axis ray and a pupil paraxial ray. FIG. 10 explains the paraxial on-axis ray and the pupil paraxial ray. In a case where the focal length of the optical system (entire system) L0 is normalized to 1, the paraxial on-axis ray is a paraxial ray incident parallel to the optical axis OA of the optical system L0 at a height of 1 from the optical axis OA. The pupil paraxial ray is a paraxial ray that passes through an intersection between the entrance pupil of the optical system L0 and the optical axis OA among rays incident on the optical axis OA at −45° in a case where the focal length of the optical system L0 is normalized to 1. In FIG. 10, GF and GR represent a front unit and a rear unit, respectively, which constitute the optical system L0. The front unit is a lens unit disposed on the object side (enlargement side) of the aperture stop SP, and the rear unit is a lens unit disposed on the image side (reduction side) of the aperture stop SP. Q represents the paraxial on-axis ray, and R represents the pupil paraxial ray. As illustrated in FIG. 10, the aperture stop SP is often provided around (near) the point P.

The optical system L0 according to each example includes an optical element (lens) A that satisfies inequalities (1) to (3) described below. In a case where the optical element A is disposed on at least one of the enlargement side (object side) and the reduction side (image side) of the point P (aperture stop SP), the optical element A has a negative refractive power. Due to the optical element A, the optical system L0 according to each example can satisfactorily correct the secondary spectrum of longitudinal chromatic aberration.

The optical material constituting the optical element A satisfies the following inequalities (1) to (3):

$$1.70 < Nd < 1.85 \quad (1)$$

$$28.0 < vd < 39.0 \quad (2)$$

$$-0.0100 < \theta gF - (0.64168 - 0.00162 \times vd) < -0.0040 \quad (3)$$

where Nd is a refractive index of the optical element A for the d-line, vd is an Abbe number of the optical element A based on the d-line, and θgF is a partial dispersion ratio of the optical element A for the g-line and F-line.

The Abbe number vd and the partial dispersion ratio θgF are expressed by the following equations (4) and (5):

$$vd = (Nd-1)/(NF-NC) \quad (4)$$

$$\theta gF = (Ng-NF)/(NF-NC) \quad (5)$$

where Nd, NF, NC, and Ng are the refractive indices for the d-line, F-line, C-line, and g-line in the Fraunhofer line, respectively.

Equations (1) to (3) illustrate that the optical element A has high dispersion, a low partial dispersion ratio, and a high refractive index. A description will now be given of the reason why the optical element A can be used to correct chromatic aberration, especially longitudinal chromatic aberration.

A longitudinal chromatic aberration coefficient L(λ) and a lateral chromatic aberration coefficient T(λ) at an arbitrary wavelength λ of the optical system L0 are expressed by the following equations (6) and (7), respectively:

$$L(\lambda) = \Sigma(hi2 \cdot \Phi i/vi(\lambda)) \quad (6)$$

$$T(\lambda) = \Sigma(hi \cdot Hi \cdot i/vi(\lambda)) \quad (7)$$

where i is a number in a case where the number of lenses is counted from the object side, Σ is the sum for i, hi is an incident height of the paraxial axial ray in an i-th lens, Hi is an incident height of the pupil paraxial ray on the i-th lens, and Φi is a refractive power of the i-th lens.

vi(λ) is defined by the following equation (8):

$$vi(\lambda) = (ni(\lambda 0)-1)/(ni(\lambda)-ni(\lambda 0)) \quad (8)$$

where ni(λ) is a refractive index of the i-th lens and λ0 is a design wavelength.

Usually, in an optical system having a large aperture diameter lens as illustrated in FIG. 10, L(λ) and T(λ) characteristically have an entirely negative and upwardly convex slope for the wavelength. Accordingly, the longitudinal chromatic aberration coefficient LA(λ) of the optical element A alone is expressed by the following equation (9):

$$LA(\lambda) = hA2 \cdot \Phi A/vA(\lambda) \quad (9)$$

where hA is an incident height of the paraxial on-axis ray on the optical element A, and ΦA is the refractive power of the optical element A.

vA(λ) is defined by the following equation (10):

$$vA(\lambda) = (nA(\lambda 0)-1)/(nA(\lambda)-nA(\lambda 0)) \quad (10)$$

where nA(λ) is a refractive index of the optical element A at an arbitrary wavelength λ, and λ0 is the design wavelength.

In order to correct longitudinal chromatic aberration in an optical system having a large aperture diameter lens, the change in LA(λ) for the wavelength and the change in L(λ) for the wavelength may cancel each other out. From FIG. 10, in a case where the optical element A is disposed on at least one of the enlargement side (object side) and the reduction side (image side) of the point P (the intersection of the optical axis OA and the pupil paraxial ray) and ΦA<0, LA(λ) has an entirely positive slope convex upward. Therefore, in order to cancel the change in L(λ) for the wavelength by LA(λ), the optical element A is to be disposed as a negative lens on at least one of the enlargement side (object side) and the reduction side (image side) of the point P.

At this time, both L(λ) and LA(λ) have upwardly convex characteristics, so longitudinal chromatic aberration is left on each short wavelength side. However, in a case where the optical element A has negative anomalous partial dispersion, the wavelength dependency of LA(λ) on the short wavelength side can be mitigated, and the residual longitudinal chromatic aberration can be reduced. Hence, in order to reduce longitudinal chromatic aberration over a wider wavelength range, the optical element A may have negative anomalous partial dispersion. The anomalous partial dispersion is a property in which the partial dispersion characteristic is different from that of ordinary glass, and the negative anomalous partial dispersion is a property in which the partial dispersion characteristic on the short wavelength side is smaller than that of ordinary glass.

However, conventional materials exhibiting high dispersion and negative anomalous partial dispersion tend to have large refractive indices. In an attempt to correct longitudinal chromatic aberration using such known materials, it is difficult to make the Petzval sum of the optical system close to 0 and to correct curvature of field. The specific gravity of the optical element tends to be large, and the weight of the lens tends to increase. Accordingly, the optical system L0 according to each example includes the optical element A that is made of an optical material having a relatively small refractive index while having high dispersion and a low partial dispersion ratio. Thereby, longitudinal chromatic aberration and curvature of field can be satisfactorily corrected.

Inequality (1) is a condition that defines the refractive index of the optical element A for the d-line. In a case where the refractive index Nd is higher than the upper limit of inequality (1), the Petzval sum becomes too large on the positive side and it becomes difficult to correct curvature of field. On the other hand, in a case where the refractive index Nd is lower than the lower limit of inequality (1), the Petzval sum becomes too large on the negative side and the curvature of field is overcorrected.

Inequality (2) is a condition that defines the Abbe number of the optical element A. In a case where the Abbe number is higher than the upper limit of inequality (2), the dispersion becomes too small, and it becomes difficult to correct primary longitudinal chromatic aberration. On the other hand, in a case where the Abbe number is lower than the lower limit of inequality (2), the transmittance of the optical material tends to decrease or the stability tends to decrease.

Inequality (3) is a condition that defines the partial dispersion ratio of the optical element A. To achromatize a specific wavelength, it is common to use an optical element with a small Abbe number (high dispersion), but it becomes difficult to suppress the secondary spectrum of chromatic aberration in a case where the partial dispersion ratio does not have a proper value. Satisfying inequality (3) by the optical element A means that the optical element A has anomalous dispersion. In a case where the anomalous dispersion is higher than the upper limit or lower than the lower limit of inequality (3), it becomes difficult to sufficiently reduce the secondary spectrum of longitudinal chromatic aberration.

In Example 1, the optical element A is the tenth lens counted from the object side. In Example 2, the optical element A is the eighth lens counted from the object side. In Example 3, the optical element A is the second lens counted from the object side. In Example 4, the optical element A is the third lens counted from the object side.

At least one of inequalities (1) to (3) may be replaced with inequalities (1a) to (3a) below:

$$1.72 < Nd < 1.84 \quad (1a)$$

$$29.0 < vd < 38.9 \quad (2a)$$

$$-0.0090 < \theta gF - (0.64168 - 0.00162 \times vd) < -0.0043 \quad (3a)$$

At least one of inequalities (1) to (3) may be replaced with inequalities (1b) to (3b) below:

$$1.74 < Nd < 1.83 \quad (1b)$$

$$29.0 < vd < 38.8 \quad (2b)$$

$$-0.0080 < \theta gF - (0.64168 - 0.00162 \times vd) < -0.0045 \quad (3b)$$

A description will now be given of the optical material (glass material) for the optical element A. Optical materials satisfying inequalities (1) to (3) can contain metal oxides. Examples of metal oxides include $SiO_2$, $TiO_2$, $La_2O_3$, $Al_2O_3$, $Nb_2O_5$, $ZrO_2$, and $Gd_2O_3$, but the disclosure is not limited to these examples. For example, $TiO_2$ has an effect of increasing a refractive index and decreasing an Abbe number (increasing dispersion), and glass containing a large amount of $TiO_2$ has a relatively high refractive index and relatively high dispersion. $Gd_2O_3$ has an effect of increasing a refractive index and increasing an Abbe number (reducing dispersion), and glass containing a large amount of $Gd_2O_3$ has a relatively high refractive index and relatively low dispersion. This is because $TiO_2$ and $Gd_2O_3$ have relatively high refractive indices and relatively high dispersion, relatively high refractive index and relatively low dispersion, respectively. Thus, the optical characteristic of optical glass changes depending on the component contained therein. This is similarly applied to optical ceramics. For example, optical ceramics containing a large amount of a substance with a relatively high refractive index and relatively low dispersion can have a relatively high refractive index and relatively low dispersion. Therefore, an optical material (such as optical glass or optical ceramics) can acquire various optical characteristics (such as a refractive index and Abbe number), by containing (dissolving or sintering) a proper amount of contained material (such as metal oxides, for example, $SiO_2$, $TiO_2$, and $La_2O_3$) in the optical material.

The optical element A may be made of a glass material that satisfies inequalities (1) to (3). The glass material is superior to a resin material in that it has fewer restrictions on workability during manufacturing and can provide a stronger refractive power. In addition, the glass material is superior in environmental resistance (such as high humidity and temperature changes) to the resin material, and has sufficient hardness. Therefore, the optical element A can be disposed closest to the object in the optical system L0.

As described above, the properly configured optical system L0 satisfying the inequality (1) to (3) can satisfactorily correct the secondary spectrum of the longitudinal chromatic aberration. In Example 3, the optical element A may be disposed on the reduction side (image side) of the point P (aperture stop SP), and have negative refractive power. Thereby, the secondary spectrum of the lateral chromatic aberration can be satisfactorily corrected in addition to the longitudinal chromatic aberration. In Example 1, the optical element A may be provided in the lens unit (second lens unit L2) closest to the image side (reduction side). Thereby, the incident height of the off-axis ray on the optical element A can be increased, and the lateral chromatic aberration can be effectively corrected.

A description will now be given of conditions that the optical system L0 according to each example may satisfy. The optical system L0 according to each example may satisfy at least one of the following inequalities (11) to (18):

$$-6.00 < fA/f < -0.20 \quad (11)$$

$$-2.0 < (rna+rnb)/(rna-rnb) < 2.0 \quad (12)$$

$$0.00 < |ra/rb| < 1.00 \quad (13)$$

$$0.15 < |ra|/f < 3.00 \quad (14)$$

$$1.55 < nN < 1.75 \quad (15)$$

$$1.00 < nP/nN < 1.20 \quad (16)$$

$$0.1 < fF/fR < 5.5 \quad (17)$$

$$1.5 < d < 4.0 \quad (18)$$

Here, fA is a focal length of the optical element A. f is the focal length of the optical system L0 (entire system). In a case where the optical system L0 is a zoom lens, f is the focal length of the optical system L0 at the wide-angle end. rna is a radius of curvature on the enlargement side (object side) of the optical element A, and rnb is a radius of curvature on the reduction side (image side) of the optical element A. ra is a radius of curvature on the aperture stop SP side of the optical element A, and rb is a radius of curvature on the side opposite to the aperture stop SP of the optical element A. nN is an average refractive index of all negative lenses in the optical system L0, and nP is an average refractive index of all positive lenses in the optical system L0. fF is a focal length of the lens unit (front unit) disposed on the object side (enlargement side) of the aperture stop SP in the optical system L0, and fR is a focal length of the lens unit (rear unit) disposed on the image side (reduction side) of the aperture stop SP in the optical system L0. d is the specific gravity of the optical element A.

Inequality (11) defines a relationship between the focal length of the optical element A and the focal length of the optical system L0. In a case where the value fA/f is higher than the upper limit of inequality (11), the refractive power of the optical element A becomes too weak, and it is likely to be insufficient to correct primary chromatic aberration. On the other hand, in a case where the value fA/f is lower than the lower limit of inequality (11), the refractive power of the optical element A becomes too strong, which may be beneficial for the correction of chromatic aberration, but other aberrations (especially curvature of field of color) tend to occur.

Inequality (12) defines a shape factor of the optical element A. Satisfying inequality (12) can effectively correct various aberrations such as chromatic aberration, curvature of field, and coma. In a case where the value (rna+rnb)/(rna−rnb) is higher than the upper limit of inequality (12), it becomes difficult to satisfactorily correct various aberrations such as chromatic aberration, spherical aberration, curvature of field, and coma. On the other hand, in a case where the value (rna+rnb)/(rna−rnb) is lower than the lower limit of inequality (12), it becomes difficult to satisfactorily correct various aberrations such as chromatic aberration, spherical aberration, curvature of field, and coma.

Inequality (13) defines a positional relationship between the surface of the optical element A having a large refractive power (the surface having a small absolute value of radius of curvature) and the aperture stop SP. In a case where the value |ra/rb| is higher than the upper limit of inequality (13), it becomes difficult to suppress high-order spherical aberration and high-order coma.

Inequality (14) defines a relationship between the radius of curvature of the optical element A on the aperture stop SP side and the focal length of the optical system L0. In a case where the value |ra|/f is higher than the upper limit of inequality (14), the radius of curvature of the optical element A becomes large relative to the focal length of the optical system L0, and it becomes difficult to satisfactorily correct various aberrations such as chromatic aberration, spherical aberration, curvature of field, and coma. On the other hand, in a case where the value |ra|/f is lower than the lower limit of inequality (14), the curvature of the optical element A becomes small relative to the focal length of the optical system L0, and the optical system becomes susceptible to various aberrations such as spherical aberration and curvature of field.

Inequality (15) defines an average value (average refractive index) of the refractive indices for the d-line of materials of all the negative lenses in the optical system L0. In a case where the average value is higher than the upper limit of inequality (15) and more negative lenses are used, it becomes difficult to satisfactorily correct various aberrations such as curvature of field and coma. On the other hand, in a case where the average value is lower than the lower limit of inequality (15) and more negative lenses are used, it becomes difficult to satisfactorily correct various aberrations such as spherical aberration and coma.

Inequality (16) defines a ratio of an average value of the refractive indices for the d-line of materials of all the positive lenses in the optical system L0, and an average value of the refractive indices for the d-line of the materials of all the negative lenses in the optical system L0. In a case where the refractive index of the positive lens material becomes so high that the value nP/nN is higher than the upper limit of inequality (16), it is beneficial in correcting field curvature, but the Abbe number of the positive lens becomes insufficient and it becomes difficult to correct longitudinal chromatic aberration. On the other hand, in a case where the refractive index of the material for the positive lens becomes so low that the value nP/nN is lower than the lower limit of inequality (16), it becomes difficult to improve the Petzval sum, and an attempt to secure the desired performance causes the overall lens length to increase.

Inequality (17) defines a relationship between the focal length of the lens unit on the enlargement side (object side) of the aperture stop SP in the optical system L0 and the focal length of the lens unit on the reduction side (image side) of the aperture stop SP in the optical system L0, and is set to correct curvature of field and shorten the overall lens length. In a case where the value fF/fR is higher than the upper limit of inequality (17) and the focal length of the lens unit on the object side of the aperture stop SP becomes longer, it is beneficial in correcting chromatic aberration and curvature of field, but the overall lens length lens increases. On the other hand, in a case where the value fF/fR is lower than the lower limit of inequality (17) and the focal length of the lens unit on the image side of the aperture stop SP becomes longer, it is difficult to secure the back focus.

Inequality (18) defines a specific gravity of the optical element A. In a case where the specific gravity of the optical element A is higher than the upper limit of inequality (18), the lens weight of the optical system L0 increases. On the other hand, in a case where the specific gravity of the optical element A is lower than the lower limit of inequality (18), it becomes difficult to make the optical element A of a glass material. In each example, in a case where the optical system L0 includes a plurality of optical elements A, the optical element A having the strongest refractive power may satisfy at least one of inequalities (11) to (18):

At least one of inequalities (11) to (17) may be replaced with inequalities (11a) to (17a) below:

$$-2.50 < fA/f < -0.35 \tag{11a}$$

$$-1.2 < (rna+rnb)/(rna-rnb) < 1.5 \tag{12a}$$

$$0.05 < |ra/rb| < 0.80 \tag{13a}$$

$$0.30 < |ra|/f < 2.50 \tag{14a}$$

$$1.60 < nN < 1.74 \tag{15a}$$

$$1.00 < nP/nN < 1.15 \tag{16a}$$

$$0.2 < fF/fR < 4.8 \tag{17a}$$

At least one of inequalities (11) to (17) may be replaced with inequalities (11b) to (17b) below:

$$-1.70 < fA/f < -0.45 \quad (11b)$$

$$-0.8 < (rna+rnb)/(rna-rnb) < 1.3 \quad (12b)$$

$$0.09 < |ra/rb| < 0.62 \quad (13b)$$

$$0.40 < |ra|/f < 2.10 \quad (14b)$$

$$1.65 < nN < 1.73 \quad (15b)$$

$$1.00 < nP/nN < 1.10 \quad (16b)$$

$$0.3 < fF/fR < 4.2 \quad (17b)$$

A description will now be given of a specific configuration of the optical system L0 according to each example.

In Example 1, the optical system L0 includes a plurality of lens units that consist of the first lens unit L1 and the second lens unit L2 arranged in this order from the object side to the image side. During focusing, the distance between the first lens unit L1 and the second lens unit L2 changes. That is, during focusing, the first lens unit L1 does not move, and the second lens unit L2 moves. The second lens unit L2 includes the optical element A and the aperture stop SP, and the optical element A is disposed on the object side of the aperture stop SP.

In Example 2, the optical system L0 includes a plurality of lens units that consist of the first lens unit L1 and the second lens unit L2 arranged in this order from the object side to the image side. During focusing, the distance between the first lens unit L1 and the second lens unit L2 changes. That is, during focusing, the first lens unit L1 moves and the second lens unit L2 does not move. The first lens unit L1 includes the optical element A and the aperture stop SP, and the optical element A is disposed on the image side of the aperture stop SP.

In each of Examples 3 and 4, the optical system L0 includes a plurality of lens units that consist of the first lens unit L1, the second lens unit L2, and the third lens unit L3 arranged in this order from the object side to the image side. During focusing, the distance between adjacent lens units changes. That is, during focusing, the first lens unit L1 does not move, the second lens unit L2 moves, and the third lens unit L3 does not move. The first lens unit L1 includes the optical element A, and the second lens unit L2 includes the aperture stop SP.

A description will now be given of numerical examples 1 to 4 corresponding to examples 1 to 4.

In each numerical example, each surface of the optical system is given a surface number i (where i is a natural number) counted from the object side. r represents a radius of curvature of each surface (mm), d represents a lens thickness or distance (air gap) (mm) on the optical axis between a surface with a surface number i and a surface with a surface number (i+1), and nd represents a refractive index for the d-line of the material for the optical element having each surface. vd represents an Abbe number for the d-line of the material for the optical element having each surface. θgF represents a partial dispersion ratio of the material for the optical element for the g-line and F-line.

In surface data according to each numerical example, an asterisk (*) is added to a surface number if the optical surface is aspheric. The aspheric surface data indicates an aspheric surface coefficient of each aspheric surface. "e±A" in the aspheric coefficient means "$\times 10^{\pm A}$." The aspheric shape of the optical surface is defined by the following equation (19):

$$x=(h^2/R)/[1+\{1-(1+k)(h/R)^2\}^{1/2}]+A4\times h^4+A6\times h^6+A8\times h^8+A10\times h^{10}+A12\times h^{12} \quad (19)$$

where x is a displacement amount from a surface vertex in the optical axis direction, h is a height from the optical axis in a direction orthogonal to the optical axis direction, R is a paraxial radius of curvature, k is a conic constant, and A4, A6, A8, A10, and A12 are aspheric coefficients.

A value of each of the focal length (mm), F-number, and half angle of view (°) is a value in a case where the optical system is in an in-focus state on an object at infinity. The overall lens length is a length obtained by adding a back focus BF to a distance on the optical axis from the frontmost lens surface (the lens surface closest to the object side) to the final surface (the lens surface closest to the image side) in the optical system. The back focus BF is a distance from the final surface of the optical system to the image plane IP.

Numerical Example 1

UNIT: mm

Surface Data

| Surface No. | r | d | nd | vd | θgF |
|---|---|---|---|---|---|
| 1 | 60.959 | 3.00 | 1.58313 | 59.4 | 0.5423 |
| 2* | 29.142 | 9.62 | | | |
| 3 | 462.700 | 1.70 | 1.48749 | 70.2 | 0.5300 |
| 4 | 30.589 | 8.76 | | | |
| 5 | −260.307 | 5.37 | 1.91082 | 35.2 | 0.5824 |
| 6 | −64.211 | 4.42 | | | |
| 7 | −39.173 | 1.65 | 1.61340 | 44.3 | 0.5633 |
| 8 | 1166.558 | 0.15 | | | |
| 9 | 122.591 | 3.28 | 1.91082 | 35.2 | 0.5824 |
| 10 | −1275.641 | 0.20 | | | |
| 11 | 69.589 | 12.30 | 1.59522 | 67.7 | 0.5442 |
| 12 | −34.452 | 1.70 | 1.73800 | 32.3 | 0.5899 |
| 13 | −54.993 | (variable) | | | |
| 14 | 47.307 | 6.26 | 1.91082 | 35.2 | 0.5824 |
| 15 | −310.702 | 0.15 | | | |
| 16 | 100.701 | 6.80 | 1.59522 | 67.7 | 0.5442 |
| 17 | −49.684 | 1.60 | 1.78000 | 35.0 | 0.5789 |
| 18 | 29.466 | 5.31 | | | |
| 19 (aperture stop) | ∞ | 5.69 | | | |
| 20 | −24.844 | 4.86 | 1.49700 | 81.5 | 0.5375 |
| 21 | −17.684 | 1.50 | 1.73800 | 32.3 | 0.5899 |
| 22 | −149.642 | 0.20 | | | |
| 23 | 77.056 | 8.59 | 1.59522 | 67.7 | 0.5442 |
| 24 | −32.641 | 0.20 | | | |
| 25* | −303.460 | 5.80 | 1.85400 | 40.4 | 0.5677 |
| 26 | −46.961 | (variable) | | | |
| 27 | ∞ | 2.00 | 1.51633 | 64.1 | 0.5353 |
| 28 | ∞ | (variable) | | | |
| Image Plane | ∞ | | | | |

Aspheric Data

2nd Surface

K = 0.00000e+00 A4 = −1.27943e−06 A6 = −3.21044e−09
A8 = 5.02252e−12 A10 = −1.14954e−14 A12 = 7.17402e−18

25th Surface

K = 0.00000e+00 A4 = −6.79027e−06 A6 = −2.37631e−09
A8 = 1.50951e−12 A10 = −2.46689e−14 A12 = 3.17958e−17

| | |
|---|---|
| Focal Length: | 34.20 |
| FNo: | 1.45 |
| Half Angle of View: | 32.32 |
| Image Height: | 21.64 |

-continued

| UNIT: mm | |
|---|---|
| Overall Lens Length (in air): | 146.31 |
| BF (in air): | 38.68 |
| d13 | 8.53 |
| d26 | 36.36 |
| d28 | 1.00 |

| Zoom Lens Unit Data | | |
|---|---|---|
| Lens Unit | Starting Surface | Focal Length |
| 1 | 1 | 167.40 |
| 2 | 14 | 57.46 |
| 3 | 27 | ∞ |

Numerical Example 2

| UNIT: mm | | | | |
|---|---|---|---|---|
| Surface Data | | | | |
| Surface No. | r | d | nd | vd | θgF |
| 1* | 85.092 | 9.70 | 1.80400 | 46.6 | 0.5573 |
| 2 | −61.222 | 1.64 | 1.68893 | 31.1 | 0.6004 |
| 3 | 50.501 | 0.20 | | | |
| 4 | 40.811 | 7.14 | 2.00100 | 29.1 | 0.5997 |
| 5 | ∞ | 0.55 | | | |
| 6 | 106.027 | 1.65 | 1.65412 | 39.7 | 0.5737 |
| 7 | 25.011 | 7.46 | | | |
| 8 | −108.216 | 1.34 | 1.66565 | 35.6 | 0.5824 |
| 9 | 35.371 | 6.51 | 1.95375 | 32.3 | 0.5898 |
| 10 | 484.039 | 2.77 | | | |
| 11 (aperture stop) | ∞ | 2.58 | | | |
| 12 | 1074.745 | 8.10 | 1.49700 | 81.5 | 0.5375 |
| 13 | −21.330 | 1.29 | 1.78000 | 35.0 | 0.5789 |
| 14 | 228.057 | 0.44 | | | |
| 15 | 92.121 | 7.61 | 1.76385 | 48.5 | 0.5589 |
| 16 | −32.596 | 1.28 | 1.66565 | 35.6 | 0.5824 |
| 17 | 109.379 | 2.12 | | | |
| 18* | 165.663 | 5.93 | 1.88300 | 40.8 | 0.5656 |
| 19 | −42.129 | (variable) | | | |
| 20 | 54.758 | 9.04 | 1.88300 | 40.8 | 0.5656 |
| 21 | −59.689 | 1.54 | 1.60342 | 38.0 | 0.5835 |
| 22 | 39.726 | 6.97 | | | |
| 23 | −61.882 | 1.21 | 1.67300 | 38.3 | 0.5757 |
| 24 | 50.828 | 5.52 | 1.80400 | 46.6 | 0.5573 |
| 25* | −309.051 | (variable) | | | |
| 26 | ∞ | 2.00 | 1.51633 | 64.1 | 0.5353 |
| 27 | ∞ | (variable) | | | |
| Image Plane | ∞ | | | | |

Aspheric Data

1st Surface

K = 0.00000e+00 A4 = −1.57720e−06 A6 = −9.66433e−10
A8 = 1.71066e−12 A10 = −3.11338e−15 A12 = 2.36827e−18

18th Surface

K = 0.00000e+00 A4 = −1.95287e−06 A6 = 3.66252e−09
A8 = −1.79752e−11 A10 = 4.68833e−14 A12 = −4.81628e−17

25th Surface

K = 0.00000e+00 A4 = 3.34452e−06 A6 = 3.06239e−09
A8 = −1.46710e−13 A10 = 4.38814e−15 A12 = 1.50462e−19

| Focal Length: | 51.27 |
|---|---|
| FNo: | 1.25 |
| Half Angle of View: | 22.88 |
| Image Height: | 21.64 |
| Overall Lens Length (in air): | 110.08 |
| BF (in air): | 14.60 |

-continued

| UNIT: mm | |
|---|---|
| d19 | 2.89 |
| d25 | 12.28 |
| d27 | 1.00 |

| Zoom Lens Unit Data | | |
|---|---|---|
| Lens Unit | Starting Surface | Focal Length |
| 1 | 1 | 61.65 |
| 2 | 20 | 535.22 |
| 3 | 26 | ∞ |

Numerical Example 3

| UNIT: mm | | | | | |
|---|---|---|---|---|---|
| Surface Data | | | | | |
| Surface No. | r | d | nd | vd | θgF |
| 1 | 62.414 | 16.10 | 1.49700 | 81.5 | 0.5375 |
| 2 | −288.715 | 3.00 | 1.75000 | 38.7 | 0.5739 |
| 3 | 173.526 | (variable) | | | |
| 4 | 77.582 | 4.33 | 2.00272 | 19.3 | 0.6452 |
| 5 | 119.471 | 0.30 | | | |
| 6 | 39.887 | 11.14 | 1.49700 | 81.5 | 0.5375 |
| 7 | 235.878 | 8.68 | | | |
| 8* | 82.930 | 2.50 | 1.85478 | 24.8 | 0.6122 |
| 9 | 29.624 | 8.89 | | | |
| 10 (aperture stop) | ∞ | 2.87 | | | |
| 11 | −94.457 | 1.50 | 1.85478 | 24.8 | 0.6122 |
| 12 | 35.879 | 7.88 | 1.88300 | 40.8 | 0.5656 |
| 13 | −75.577 | 1.42 | | | |
| 14 | −45.597 | 1.70 | 1.54072 | 47.2 | 0.5651 |
| 15 | 69.967 | 6.19 | 1.95375 | 32.3 | 0.5898 |
| 16 | −61.056 | (variable) | | | |
| 17 | 140.248 | 6.87 | 1.95375 | 32.3 | 0.5898 |
| 18 | −51.742 | 2.20 | 1.67300 | 38.1 | 0.5754 |
| 19 | 55.509 | 6.38 | | | |
| 20 | −47.003 | 1.65 | 1.67270 | 32.1 | 0.5988 |
| 21 | −1008.760 | 0.20 | | | |
| 22 | 77.245 | 4.77 | 1.90043 | 37.4 | 0.5774 |
| 23 | 1395.353 | (variable) | | | |
| 24 | ∞ | 2.00 | 1.51633 | 64.1 | 0.5353 |
| 25 | ∞ | (variable) | | | |
| Image Plane | ∞ | | | | |

Aspheric Data

8th Surface

K = 0.00000e+00 A4 = −3.41965e−06 A6 = −7.44591e−10
A8 = 1.00265e−12 A10 = −3.57550e−16 A12 = −0.00000e−00

| Focal Length: | 86.48 |
|---|---|
| FNo: | 1.24 |
| Half Angle of View: | 14.04 |
| Image Height: | 21.64 |
| Overall Lens Length (in air): | 134.49 |
| BF (in air): | 14.67 |
| d3 | 19.23 |
| d16 | 2.01 |
| d23 | 12.35 |
| d25 | 1.00 |

-continued

UNIT: mm

Zoom Lens Unit Data

| Lens Unit | Starting Surface | Focal Length |
|---|---|---|
| 1 | 1 | 306.49 |
| 2 | 4 | 87.17 |
| 3 | 17 | −529.76 |
| 4 | 24 | ∞ |

Numerical Example 4

UNIT: mm

Surface Data

| Surface No. | r | d | nd | vd | θgF |
|---|---|---|---|---|---|
| 1 | 90.781 | 10.31 | 1.59282 | 68.6 | 0.5458 |
| 2 | −786.212 | 7.77 | | | |
| 3 | 50.573 | 7.58 | 1.49700 | 81.5 | 0.5375 |
| 4 | 172.424 | 1.98 | | | |
| 5 | 794.806 | 3.50 | 1.82000 | 30.0 | 0.5889 |
| 6 | 87.565 | 7.20 | | | |
| 7 | 55.796 | 5.29 | 1.49700 | 81.5 | 0.5375 |
| 8 | 217.460 | 0.30 | | | |
| 9 | 31.843 | 2.50 | 1.59270 | 35.3 | 0.5933 |
| 10 | 25.469 | 9.62 | | | |
| 11 (aperture stop) | ∞ | (variable) | | | |
| 12 | −272.206 | 3.33 | 2.00069 | 25.5 | 0.6136 |
| 13 | −77.356 | 2.00 | 1.64000 | 60.1 | 0.5370 |
| 14 | 41.860 | (variable) | | | |
| 15 | −42.869 | 2.00 | 1.73800 | 32.3 | 0.5899 |
| 16 | 75.203 | 5.59 | 1.80400 | 46.6 | 0.5572 |
| 17 | −54.335 | 0.20 | | | |
| 18 | 109.208 | 3.74 | 1.88300 | 40.8 | 0.5667 |
| 19 | −262.201 | (variable) | | | |
| 20 | ∞ | 2.00 | 1.51633 | 64.1 | 0.5353 |
| 21 | ∞ | (variable) | | | |
| Image Plane | ∞ | | | | |

| | |
|---|---|
| Focal Length: | 133.33 |
| FNo: | 2.06 |
| Half Angle of View: | 9.22 |
| Image Height: | 21.64 |
| Overall Lens Length (in air): | 153.32 |
| BF (in air): | 54.40 |

| | |
|---|---|
| d11 | 1.54 |
| d14 | 24.45 |
| d19 | 52.08 |
| d21 | 1.00 |

Zoom Lens Unit Data

| Lens Unit | Starting Surface | Focal Length |
|---|---|---|
| 1 | 1 | 99.48 |
| 2 | 12 | −69.69 |
| 3 | 15 | 85.29 |
| 4 | 20 | ∞ |

Table 1 below illustrates various values for each numerical example.

TABLE 1

| | EXAMPLE 1 | EXAMPLE 2 | EXAMPLE 3 | EXAMPLE 4 |
|---|---|---|---|---|
| Nd | 1.78 | 1.78 | 1.75 | 1.82 |
| vd | 35 | 35 | 38.7 | 30 |
| θgF | 0.5789 | 0.5789 | 0.5739 | 0.5889 |
| fA | −23.505 | −24.951 | −144.111 | −120.276 |
| f | 34.198 | 51.279 | 86.484 | 133.331 |
| rna | −49.684 | −21.330 | −288.715 | 794.806 |
| rnb | 29.466 | 228.057 | 173.526 | 87.565 |
| ra | 29.466 | −21.330 | 173.526 | 87.565 |
| rb | −49.684 | 228.057 | −288.715 | 794.806 |
| nN | 1.657 | 1.676 | 1.724 | 1.698 |
| nP | 1.734 | 1.824 | 1.813 | 1.712 |
| fF | 78.473 | 191.624 | 147.350 | 99.483 |
| fR | 49.500 | 46.071 | 76.436 | 305.116 |
| d | 3.47 | 3.47 | 3.47 | 3.47 |
| Inequality (1) | 1.78 | 1.78 | 1.75 | 1.82 |
| Inequality (2) | 35 | 35 | 38.7 | 30 |
| Inequality (3) | −0.0061 | −0.0061 | −0.0051 | −0.0042 |
| Inequality (11) | −0.687 | −0.487 | −1.666 | −0.902 |
| Inequality (12) | 0.255 | −0.829 | 0.249 | 1.248 |
| Inequality (13) | 0.593 | 0.094 | 0.601 | 0.110 |
| Inequality (14) | 0.862 | 0.416 | 2.006 | 0.657 |
| Inequality (15) | 1.657 | 1.676 | 1.724 | 1.698 |
| Inequality (16) | 1.046 | 1.088 | 1.051 | 1.009 |
| Inequality (17) | 1.585 | 4.159 | 1.928 | 0.326 |
| Inequality (18) | 3.47 | 3.47 | 3.47 | 3.47 |

Image Pickup Apparatus

Figure 9:
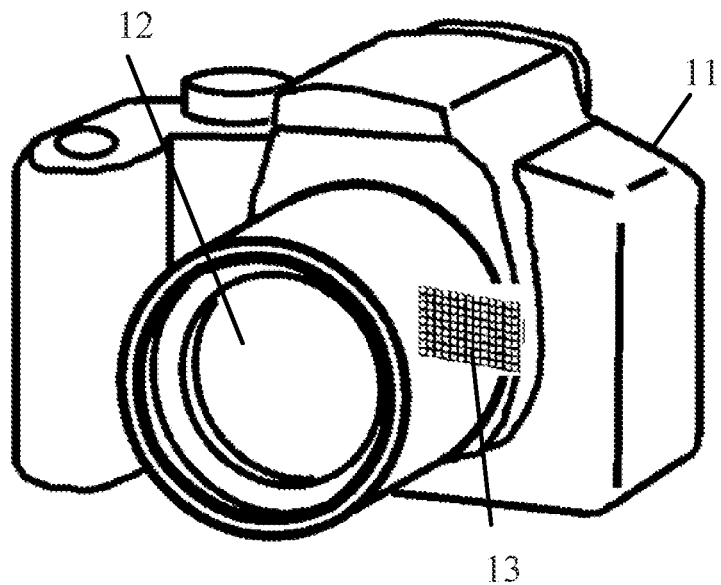
FIG. 9 is a schematic diagram of an image pickup apparatus having the optical system according to each example.

Referring now to FIG. 9, a description will be given of an image pickup apparatus (digital still camera) 10 including the optical system L0 according to each example. FIG. 9 is a schematic diagram of an image pickup apparatus 10. The image pickup apparatus 10 includes a camera body 11 and a lens apparatus 12 attachable to and detachable from the camera body 11. The lens apparatus 12 includes the optical system L0 according to any one of Examples 1 to 4. An image sensor (photoelectric conversion element) 13 such as a CCD sensor or a CMOS sensor is built into the camera body 11 and receives and photoelectrically converts an optical image formed by the lens apparatus 12. The camera body 11 may be a so-called single-lens reflex camera with a quick turn mirror, or a so-called mirrorless camera without a quick turn mirror.

Thus, applying the optical system L0 according to each example to an image pickup apparatus such as a digital still camera can provide high optical performance in which the secondary spectrum of longitudinal chromatic aberration is satisfactorily corrected. Therefore, each example can provide an optical system and an image pickup apparatus in which various aberrations are satisfactorily corrected.

Each of the above examples can provide an optical system in which various aberrations are satisfactorily corrected.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-073886, filed on Apr. 27, 2022, which is hereby incorporated by reference herein in its entirety.

What is claimed is:

1. An optical system comprising an optical element having negative refractive power and disposed on at least one of an object side and an image side of an intersection of an optical axis and a pupil paraxial ray,
   wherein the optical element is made of a glass material, and
   wherein the following inequalities are satisfied:

$1.70 < Nd < 1.85$ $28.0 < vd < 39.0$ $-0.0100 < \theta gF - (0.64168 - 0.00162 \times vd) < -0.0040$, where Nd is a refractive index of the optical element for d-line, vd is an Abbe number of the optical element based on the d-line, and θgF is anomalous partial dispersion of the optical element for g-line and F-line.

2. The optical system according to claim 1, wherein the following inequality is satisfied:

$-6.00 < fA/f < -0.20$ where f is a focal length of the optical system and fA is a focal length of the optical element.

3. The optical system according to claim 1, wherein the following inequality is satisfied:

$-2.0 < (rna+rnb)/(rna-rnb) < 2.0$ where rna is a radius of curvature of a lens surface on the object side of the optical element, and rnb is a radius of curvature of a lens surface on the image side of the optical element.

4. The optical system according to claim 1, further comprising an aperture stop,
   wherein the following inequalities are satisfied:

$0.00 < |ra/rb| < 1.00$ $0.15 < |ra|/f < 3.00$ where ra is a radius of curvature of one of lens surfaces of the optical element closer to the aperture stop, and rb is a radius of curvature of the other lens surface of the optical element farther from the aperture stop.

5. The optical system according to claim 1, wherein the following inequality is satisfied:

$1.55 < nN < 1.75$ where nN is an average refractive index of all negative lenses in the optical system.

6. The optical system according to claim 1, wherein the following inequality is satisfied:

$1.00 < nP/nN < 1.20$ where nP is an average refractive index of all positive lenses in the optical system.

7. The optical system according to claim 1, further comprising an aperture stop,
   wherein the following inequality is satisfied:

$0.1 < fF/fR < 5.5$ where fF is a focal length of a lens unit disposed on the object side of the aperture stop in the optical system, and fR is a focal length of a lens unit disposed on the image side of the aperture stop in the optical system.

8. The optical system according to claim 1, wherein the following inequality is satisfied:

$1.5 < d < 4.0$ where d is a specific gravity of the optical element.

9. The optical system according to claim 1, wherein the optical system includes a plurality of lens units that consist of a first lens unit and a second lens unit arranged in this order from the object side to the image side,
   wherein during focusing, a distance between the first lens unit and the second lens unit changes, and
   wherein the second lens unit includes the optical element.

10. The optical system according to claim 1, wherein the optical system includes a plurality of lens units that consist of a first lens unit and a second lens unit arranged in this order from the object side to the image side,
    wherein during focusing, a distance between the first lens unit and the second lens unit changes, and
    wherein the first lens unit includes the optical element.

11. The optical system according to claim 1, wherein the optical system includes a plurality of lens units that consist of a first lens unit, a second lens unit, and a third lens unit arranged in this order from the object side to the image side,
    wherein during focusing, a distance between adjacent lens units changes, and
    wherein the first lens unit includes the optical element.

12. An image pickup apparatus comprising:
    an optical system; and
    an image sensor configured to receive an image formed by the optical system,
    wherein the optical system includes an optical element having negative refractive power and disposed on at least one of an object side and an image side of an intersection of an optical axis and a pupil paraxial ray,
    wherein the optical element is made of a glass material, and
    wherein the following inequalities are satisfied:

$1.70 < Nd < 1.85$ $28.0 < vd < 39.0$ $-0.0100 < \theta gF - (0.64168 - 0.00162 \times vd) < -0.0040$.

where Nd is a refractive index of the optical element for d-line, vd is an Abbe number of the optical element based on the d-line, and θgF is anomalous partial dispersion of the optical element for g-line and F-line.

* * * * *